(12) United States Patent
Edgecomb

(10) Patent No.: US 7,374,087 B1
(45) Date of Patent: May 20, 2008

(54) METHOD, APPARATUS AND SYSTEM FOR CONVEYING CARTRIDGE NOTIFICATION

(75) Inventor: Tracy L. Edgecomb, Berkeley, CA (US)

(73) Assignee: Leapfrog Enterprises, Inc., Emeryville, CA (US)

( * ) Notice: Subject to any disclaimer, the term of this patent is extended or adjusted under 35 U.S.C. 154(b) by 244 days.

(21) Appl. No.: 11/193,583

(22) Filed: Jul. 29, 2005

(51) Int. Cl.
*G06K 7/00* (2006.01)

(52) U.S. Cl. ........................ 235/435; 235/494

(58) Field of Classification Search ............. 235/435, 235/375, 494
See application file for complete search history.

(56) References Cited

U.S. PATENT DOCUMENTS

| | | | | |
|---|---|---|---|---|
| 5,442,147 | A | * | 8/1995 | Burns et al. ............. 178/18.09 |
| 6,119,941 | A | * | 9/2000 | Katsandres et al. .... 235/462.07 |
| 6,446,871 | B1 | * | 9/2002 | Buckley et al. ........ 235/472.03 |
| 6,502,756 | B1 | | 1/2003 | Fahraeus |
| 6,523,749 | B2 | * | 2/2003 | Reasoner et al. ...... 235/462.25 |
| 6,966,495 | B2 | | 11/2005 | Lynggaard et al. |
| 7,123,445 | B2 | * | 10/2006 | Spychalla .................... 360/133 |
| 2003/0061103 | A1 | * | 3/2003 | Kanai ........................... 705/22 |
| 2005/0023345 | A1 | * | 2/2005 | Furuyama et al. .......... 235/382 |

FOREIGN PATENT DOCUMENTS

| | | |
|---|---|---|
| WO | WO 00/73983 A1 | 12/2000 |
| WO | WO 01/01670 A1 | 1/2001 |
| WO | WO 01/16691 A1 | 3/2001 |
| WO | WO 01/26032 A1 | 4/2001 |
| WO | WO 01/71473 A1 | 9/2001 |
| WO | WO 01/71475 A1 | 9/2001 |
| WO | WO 01/75723 A1 | 10/2001 |
| WO | WO 01/75773 A1 | 10/2001 |
| WO | WO 01/75780 A1 | 10/2001 |
| WO | WO 01/95559 A1 | 12/2001 |

\* cited by examiner

*Primary Examiner*—Ahshik Kim (57) ABSTRACT

Embodiments of the invention recite a method, apparatus and system for conveying cartridge notification. In one embodiment, a permanently encoded pattern of location information embedded on a printed medium is recognized using an electronic interactive device. Note that the encoded pattern identifies an application. A determination can be made as to whether the electronic interactive device has access to the application based on its memory and the memory of an attached cartridge. In response to the electronic interactive device not having access to the application, it is determined based on a cartridge lookup table of which cartridge includes the application. A message can be conveyed regarding the cartridge to the user. The cartridge lookup table may be populated with information regarding the application contents of various cartridges in response to these cartridges being inserted into the interactive device.

12 Claims, 8 Drawing Sheets

METHOD, APPARATUS AND SYSTEM FOR CONVEYING CARTRIDGE NOTIFICATION

BACKGROUND

In the last twenty years, the use of personal computing devices, such as desktop computer systems, laptop computer systems, handheld computers systems, and tablet computer systems, has grown tremendously. These personal computing devices provide users with a broad range of interactive applications, business utilities, communication abilities, and entertainment possibilities.

Current personal computing devices provide access to these interactive applications via a user interface. Typical computing devices have on-screen graphical interfaces that present information to a user using a display device, such as a monitor or display screen, and receive information from a user using an input device, such as a mouse, a keyboard, a joystick, or a stylus.

Even more so than computing systems, the use of pen and paper is ubiquitous among literate societies. While graphical user interfaces of current computing devices provide for effective interaction with many computing applications, typical on-screen graphical user interfaces have difficulty mimicking the common use of a pen or pencil and paper. For example, desktop and laptop computer systems typically do not have a pen-like interface. Moreover, input into a computer is shown on an electronic display, and is not tangible and accessible like information written on paper or a physical surface.

Finally, images and writings drawn with a pen-like interface on a paper surface have convenience, permanence, and tangibility, but do not allow for easy reuse of the paper surface once it has been utilized with the pen-like interface.

SUMMARY

Embodiments of the invention recite a method, apparatus and system for conveying cartridge notification regarding a pen computing device wherein one or more removable cartridges may be used in conjunction with the device. Each cartridge may contain one or more applications within computer readable memory. In one embodiment, a permanently encoded pattern of location information embedded on a printed medium is recognized using an electronic interactive device. Note that the encoded pattern identifies an application assigned therewith. A determination can be made as to whether the electronic interactive device has access to the application. In response to the electronic interactive device not having access to the application, it is determined which cartridge includes the application. A message can be conveyed regarding the cartridge.

In one embodiment, as a user inserts a cartridge into the interactive device, messages are conveyed from the cartridge to the device regarding the applications resident in the cartridge. This information may include an identification of the applications resident on the inserted cartridge and a respective text message associated with each. This information is then stored in the interactive device and remains resident after the cartridge is removed. This happens for each cartridge inserted into the device such that the interactive device constructs a table indicating which applications are resident on which cartridges. This may be stored in a memory resident lookup table on the interactive device.

Using this table, and knowing which cartridge is currently in use by a user, the interactive device can give information (e.g., render the text message) to a user if he/she attempts to invoke an application that is not resident on the current cartridge. For instance, if a user attempts to invoke an application A that is resident on cartridge A, but cartridge B is currently inserted into the interactive device, then the interactive device may render the audible message, "you need cartridge A to run application A; please insert cartridge A." This message is useful as it informs the user which cartridge to obtain for the particular application, rather than merely informing the user that the application is not available with the currently inserted cartridge.

In an embodiment of the invention, a printed medium such as paper, a book, a catalog, a magazine, a newspaper, etc., comprises the permanently printed encoded pattern of location information. In various embodiments of the invention, the electronic interactive device may be a pen-based computing system. In various embodiments of the invention, some portions of the location information in the permanently printed encoded pattern can be associated with an application.

In one embodiment, the invention includes a system comprising a removable cartridge and an electronic interactive device comprising a cartridge registry wherein the electronic device is for use with a printed medium. The cartridge registry comprises a listing of instructional messages indicating access to various applications. The printed medium comprises an encoded pattern of location information embedded therein which is recognizable to the electronic interactive device. The cartridge comprises an application identified by the encoded pattern and an instructional message indicating access to the application. Note that the application is accessible by the electronic interactive device when the cartridge is coupled to the electronic interactive device. Furthermore, the system can include a communication device of the electronic interactive device for conveying an instructional message regarding the cartridge when an attempt is made to invoke the application (and the cartridge is not currently accessible by the electronic interactive device).

In yet another embodiment, the invention includes an electronic interactive device comprising an optical unit for use with a printed medium. It is appreciated that the printed medium comprises an encoded pattern of location information. The optical unit can be for detecting the encoded pattern. The electronic interactive device also comprises a processor coupled with the optical unit and a memory coupled with the processor. The memory can be for storing instructions that when executed implement a method. The method comprises recognizing the encoded pattern identifies an application. Additionally, the method includes determining whether the memory comprises the application. In response to the memory not comprising the application, a message can be conveyed regarding access to the application.

Embodiments are also directed to a method of transferring information to an electronic interactive device comprising: detecting that a first removable cartridge has been inserted into said electronic interactive device wherein said first removable cartridge comprises a first application and information relating to said first application including an instructional message regarding access to said first application; and transferring said instructional message regarding access to said first application to a lookup table resident in a memory unit of said electronic interactive device wherein said electronic interactive device is operable to be attached to said first cartridge and wherein said lookup table comprises a plurality of entries wherein each entry comprises an instructional message corresponding to an associated application wherein each instructional message is operable to be rendered to said user in response to said electronic interactive device identifying an associated application that is not resident within said electronic interactive device or a cartridge attached thereto. Embodiments include the above wherein said instructional message regarding access to said application identifies a cartridge which contains said application.

While particular embodiments in accordance with the invention have been specifically described within this summary, it is noted that the invention is not limited to these embodiments. The invention is intended to cover alternatives, modifications and equivalents which may be included within the scope of the invention as construed by the Claims.

DETAILED DESCRIPTION

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications and equivalents, which may be included within the scope of the invention as construed according to the Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the invention, discussions utilizing terms such as "recognizing" or "initiating" or "conveying" or "embedding" or "coupling" or "accessing" or "identifying" or "receiving" or "outputting" or "generating" or "determining" or "associating" or "storing" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
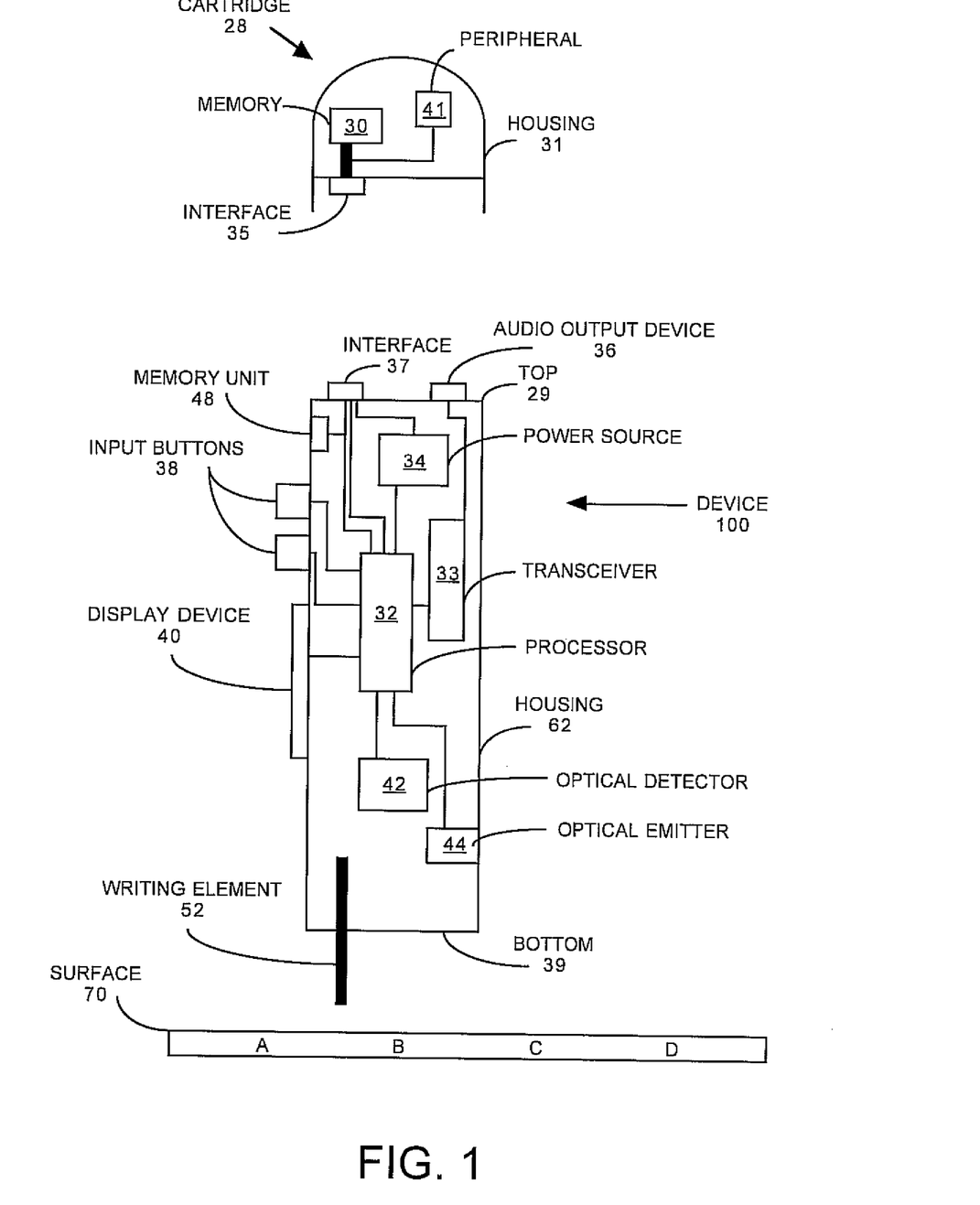
FIG. 1 is a block diagram of an electronic interactive device upon which various embodiments of the invention can be implemented.

FIG. 1 is a block diagram of an electronic interactive device 100 upon which various embodiments of the invention can be implemented. In general, device 100 may be referred to as a pen-shaped, or pen-based, computer system or an optical device, or more specifically as an optical reader, optical pen or digital pen.

In the embodiment of FIG. 1, device 100 includes a processor 32 inside a housing 62. In one embodiment, housing 62 has the form of a pen or other writing utensil or writing instrument. Processor 32 is operable for processing information and instructions used to implement the functions of device 100, which are described below. Additionally, processor 32 can be operable for processing information and instructions used to implement the functions associated with any cartridge (e.g., 28) coupled to device 100, which are also described below.

In one embodiment, the device 100 may include an audio output device 36, a display device 40, or both an audio device and display device may be coupled to the processor 32. In other embodiments, the audio output device and/or the display device are optional or are physically separated from device 100, but in communication with device 100 through either a wired and/or wireless connection. For wireless communication, device 100 can include a transmitter or transceiver 33. The audio output device 36 may include a speaker or an audio jack (e.g., for an earphone or headphone). The display device 40 may be a liquid crystal display (LCD) or some other suitable type of display.

In the embodiment of FIG. 1, device 100 may include input buttons 38 coupled to the processor 32 for activating and controlling the device 100. For example, the input buttons 38 allow a user to input information and commands to device 100 or to turn device 100 on or off. Device 100 can also include a power source 34 such as a battery, but is not limited to such.

Device 100 can also include a light source or optical emitter 44 and a light sensor or optical detector 42 coupled to the processor 32. The optical emitter 44 may be a light emitting diode (LED), for example, and the optical detector 42 may be a charge coupled device (CCD) or complementary metal-oxide semiconductor (CMOS) imager array, for example. The optical emitter 44 illuminates surface 70 or a portion thereof. Light reflected from the surface 70 can be received at and recorded by optical detector 42. Note that optical detector 42 and/or optical emitter 44 can be referred to as an optical unit.

In one embodiment, a pattern of markings is printed on surface 70. The surface 70 may be any suitable surface on which a pattern of markings can be printed (or formed or deposited), such as a sheet of paper or other types of surfaces. The bottom end 39 of device 100 that can hold optical emitter 44 and optical detector 42 is placed against or near surface 70. As device 100 is moved relative to the surface 70, the pattern of markings can be read and recorded by optical emitter 44 and optical detector 42. As discussed in more detail further below, in one embodiment, the markings on surface 70 are used to determine the position of device 100 relative to surface 70 (e.g., see FIGS. 3 and 4). In another embodiment, the markings on surface 70 can be used to encode information. The captured images of surface 70 can be analyzed (processed) by device 100 to decode the markings and recover the encoded information.

Device 100 of FIG. 1 can also include a memory unit 48 coupled to the processor 32. In one embodiment, memory unit 48 is a removable memory unit embodied as a memory cartridge or a memory card. In another embodiment, memory unit 48 can include volatile memory and/or non-volatile memory for storing information and instructions for processor 32. For example, memory unit 48 can include, but is not limited to, Flash memory, programmable read-only memory (PROM), erasable programmable read-only memory (EPROM), electrically erasable programmable read-only memory (EEPROM), random access memory (RAM) and/or read-only memory (ROM) for storing information and instructions for processor 32.

In the embodiment of FIG. 1, device 100 can include a writing element 52 situated at the same end (e.g., 39) of device 100 as the optical detector 42 and the optical emitter 44. Writing element 52 can be, for example, a pen, pencil, marker, stylus, or the like, and may or may not be retractable. In certain applications, writing element 52 is not needed. In other applications, a user can use writing element 52 to make marks on surface 70, including characters such as letters, numbers, symbols and the like. These user-produced marks can be scanned (e.g., imaged) and interpreted by device 100 according to their position on surface 70. The position of the user-produced marks can be determined using a pattern of marks that are printed on surface 70 (e.g., refer to the discussion of FIGS. 3 and 4, below). In one embodiment, the user-produced markings can be interpreted by device 100 using optical character recognition (OCR) techniques that recognize handwritten characters.

Surface 70 may be a sheet of paper, although surfaces consisting of materials other than paper may be used. Surface 70 may be a flat panel display screen (e.g., an LCD) or electronic paper (e.g., reconfigurable paper that utilizes electronic ink). Also, surface 70 may or may not be flat. For example, surface 70 may be embodied as the surface of a globe. Furthermore, surface 70 may be smaller or larger than a conventional (e.g., 8.5×11 inches) page of paper. In general, surface 70 can be any type of surface upon which markings (e.g., letters, numbers, symbols, characters, etc.) can be printed or otherwise deposited or formed. Alternatively, surface 70 can be a type of surface wherein a characteristic of the surface changes in response to action on the surface by device 100.

FIG. 1 also shows an exemplary cartridge 28 that can be utilized in combination with device 100 in accordance with various embodiments of the invention. Specifically, by coupling (or connecting) cartridge 28 to device 100, the cartridge 28 can expand the functionality of device 100 by enabling device 100 to utilizes one or more applications of its memory 30 that can be used in combination with specific portions of surface 70. In one embodiment, portions of an application can be made active in memory 48 of the device 100, while the bulk of the contents of the application remain within memory 30 of cartridge 28 and are read and executed directly from cartridge 28 by processor 32. As such, device 100 is able to utilize the one or more applications stored by cartridge 28.

Specifically, in accordance with one embodiment of the invention, cartridge 28 can include a memory 30, an interface 35 along with an optional peripheral 41 that can all be located within a cartridge housing 31. In one embodiment, the cartridge housing 31 can have the form of a pen cap or a cap for a writing instrument or utensil (e.g., device 100). For example, in one embodiment, the cartridge housing 31 can be designed to securely fit over (or attach to) a top portion 29 and a bottom portion 39 of the housing 62 of device 100. As such, the housing 31 of cartridge 28 can be shaped such that it can be fit securely or attached to device 100 in a manner similar to when a pen cap is fit securely or attached to a pen. Specifically, housing 31 of cartridge 28 can be designed to fit securely onto or attach to the top portion 29 of the housing 62 of device 100. Furthermore, housing 31 of cartridge 28 can be designed to also fit securely onto or attached to the bottom portion 39 of the housing 62 of device 100, thereby enabling cartridge 28 to be utilized as a cap (or cover) for device 100 for covering and/or protecting writing element 52, optical detector 42 and/or optical emitter 44. It is appreciated that cartridge 28 can be passively stored when is securely fit or attached to bottom portion 39 of device 100.

Within FIG. 1, device 100 can include an interface 37 for enabling a cartridge (e.g., 28) to be coupled to device 100. Interface 37 is coupled to memory unit 48, processor 32 and power source 34 of device 100. It is appreciated that when the housing 31 of cartridge 28 is securely fit onto or attached to top portion 29 of housing 62 of device 100, interface 35 of cartridge 28 can electrically couple to interface 37 of device 100. When coupled in this manner, cartridge 28 can be coupled to the processor 32, power source 34 and memory unit 48 of device 100. As such, in one embodiment, the information, including any application, code, text and/or audio files, that is stored in cartridge memory 30 can be read and executed directly from cartridge 28 by the processor 32. Note that memory 30 of cartridge 28 can also store other information besides one or more applications. For example, memory 30 can also store, but is not limited to, an identification (ID) corresponding to each application memory 30 stores, a definition of the dot or map space that each application is active within (described in detail below), and a text message or audio message corresponding to one or more applications memory 30 stores which can be used to provide audio sounds, messages and/or prompts to the user via interactive device 100. Understand that a copy of all (or part) of the above information stored by memory 30 can be downloaded to memory 48 of device 100 to be stored thereon. In one embodiment, after a copy of all or part of the above information has been downloaded from memory 30 of cartridge 28 into memory 48 of device 100, the cartridge 28 can be removed (or uncoupled) from device 100.

Cartridge 28 can also optionally include one or more peripherals (e.g., 41) that can be associated with one or more applications stored by cartridge 28. For example, the optional peripheral 41 can be implemented as, but is not limited to, a rumble pack, a light-emitting diode (LED), an upgraded display, an upgraded speaker, and the like. Peripheral 41 can be coupled to device 100 via interface 35 of cartridge 28. It is understood that memory 30 of cartridge 28 can be implemented in a wide variety of ways. For example, memory 30 can be implemented with, but is not limited to, Flash memory, programmable read-only memory (PROM), erasable programmable read-only memory (EPROM), electrically erasable programmable read-only memory (EEPROM), and/or any other non-volatile memory that can store data after being disconnected from an electrical source for an extended time period.

Figure 2:
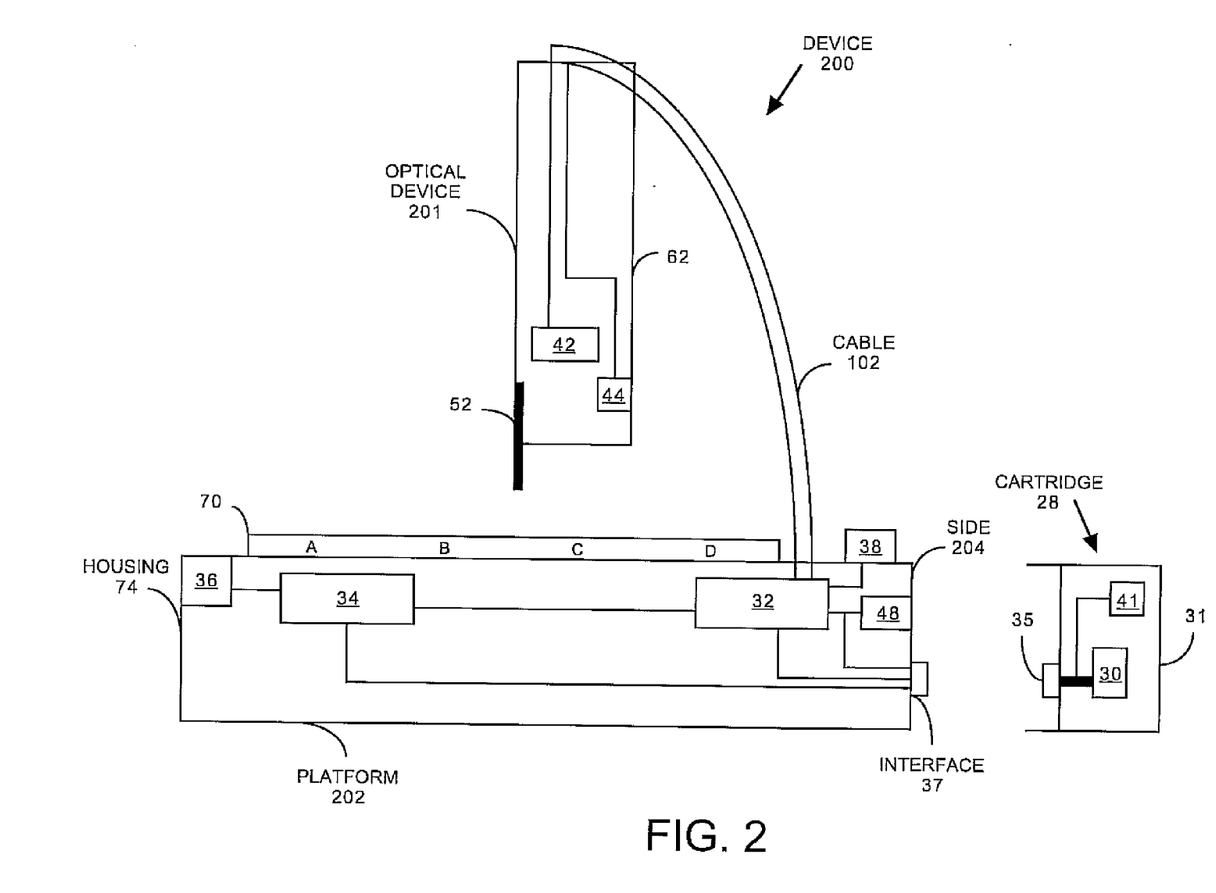
FIG. 2 is a block diagram of another electronic interactive device upon which various embodiments of the invention can be implemented.

FIG. 2 is a block diagram of another electronic interactive device 200 upon which various embodiments of the invention can be implemented. Device 200 includes processor 32, power source 34, audio output device 36, input buttons 38, memory unit 48, optical detector 42, optical emitter 44, writing element 52 and interface 37, previously described herein. However, in the embodiment of FIG. 2, optical detector 42, optical emitter 44 and writing element 52 are embodied as optical device 201 in housing 62, and processor 32, power source 34, audio output device 36, input buttons 38, interface 37 and memory unit 48 are embodied as platform 202 that includes housing 74. In the present embodiment, optical device 201 is coupled to platform 202 by a cable 102; however, a wireless connection can be used instead. The elements illustrated by FIG. 2 can be distributed between optical device 201 and platform 200 in combinations other than those described above.

Additionally, FIG. 2 also shows cartridge 28 that can include memory 30, interface 35, and optional peripheral 41, previously described herein. Moreover, cartridge 28 can also include housing 31' that is shaped to enable cartridge 28 to be securely coupled to side 204 of the housing 74 of platform 202. Note that housing 31' has a different shape than housing 31 of FIG. 1. In one embodiment, if interface 37 is implemented as part optical device 201, housing 31' of cartridge 28 can be modified such that it can enable cartridge 28 to be securely coupled to optical device 201.

Figure 3:
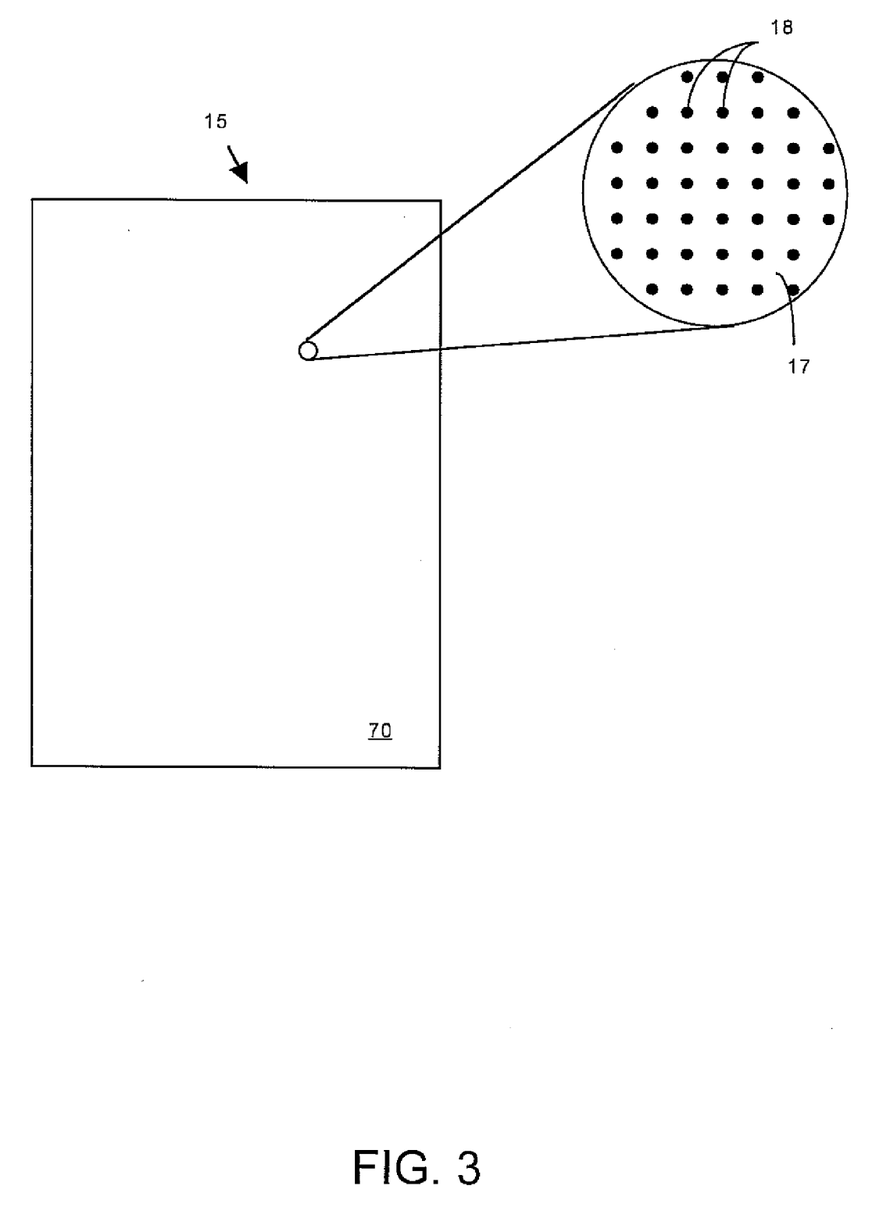
FIG. 3 shows an exemplary sheet of paper provided with a pattern of marks according to one embodiment of the invention.

FIG. 3 shows a sheet of paper 15 provided with a pattern of marks according to one embodiment of the invention. In the embodiment of FIG. 3, sheet of paper 15 is provided with a coding pattern in the form of optically readable position code 17 that consists of a pattern of marks 18. The marks 18 in FIG. 3 are greatly enlarged for the sake of clarity. In actuality, the marks 18 may not be easily discernible by the human visual system, and may appear as grayscale on sheet of paper 15. In one embodiment, the marks 18 are embodied as dots; however, the invention is not so limited. In one embodiment, the pattern of marks (or position code) can be permanently printed or deposited or formed or embedded on paper 15 (or any other type of printed medium).

Figure 4:
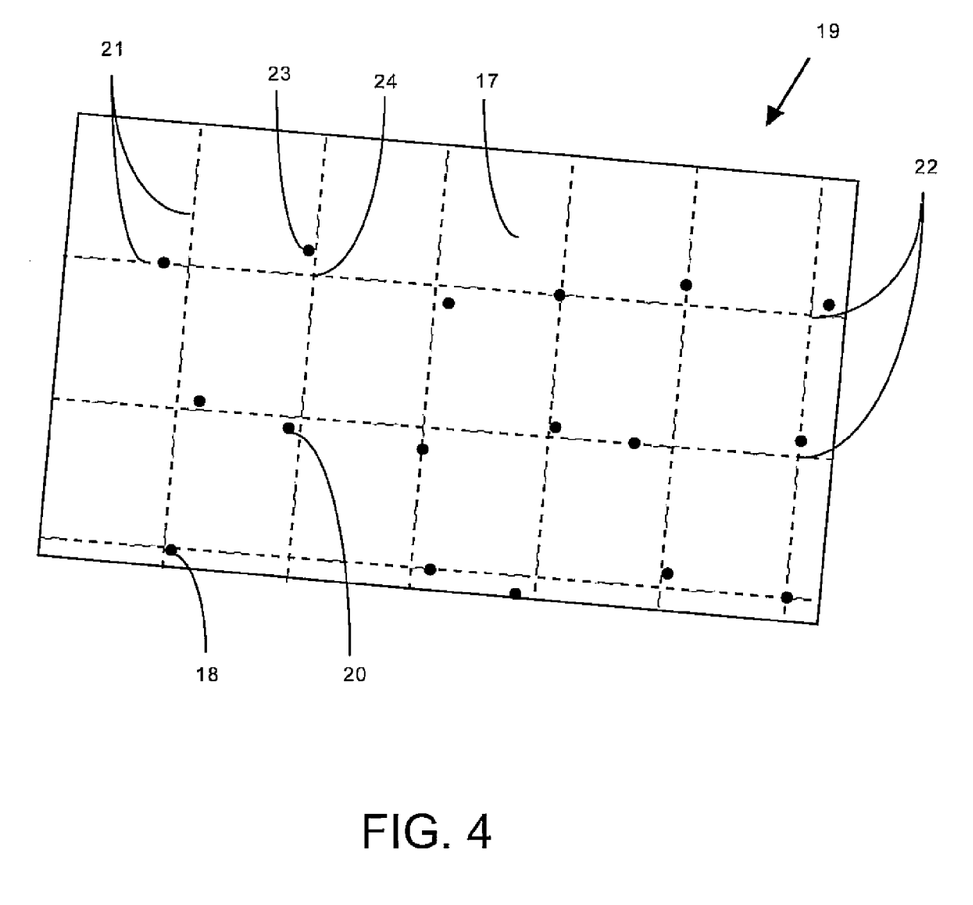
FIG. 4 shows an enlargement of a pattern of marks on an exemplary sheet of paper according to one embodiment of the invention.

FIG. 4 shows an enlarged portion 19 of the position code 17 of FIG. 3 according to one embodiment of the invention. An optical device such as device 100 or 200 (FIGS. 1 and 2) can be positioned to record an image of a region of the position code 17. In one embodiment, the optical device fits the marks 18 to a reference system in the form of a raster with raster lines 21 that intersect at raster points 22. Each of the marks 18 is associated with a raster point 22. For example, mark 23 is associated with raster point 24. For the marks in an image/raster, the displacement of a mark from the raster point associated with the mark can be determined. Using these displacements, the pattern in the image/raster is compared to patterns in the reference system. Each pattern in the reference system is associated with a particular location on the surface 70. Thus, by matching the pattern in the image/raster with a pattern in the reference system, the position of the pattern on the surface 70, and hence the position of the optical device relative to the surface 70, can be determined. Additional information is provided by the following patents and patent applications, herein incorporated by reference in their entirety for all purposes: U.S. Pat. No. 6,502,756; U.S. patent application Ser. No. 10/179,966 filed on Jun. 26, 2002; WO 01/95559; WO 01/71473; WO 01/75723; WO 01/26032; WO 01/75780; WO 01/01670; WO 01/75773; WO 01/71475; WO 01/73983; and WO 01/16691. See also Patent Application No. 60/456,053 filed on Mar. 18, 2003, and patent application Ser. No. 10/803,803 filed on Mar. 17, 2004, both of which are incorporated by reference in their entirety for all purposes.

With reference back to FIG. 1, four positions or regions on surface 70 are indicated by the letters A, B, C and D (note that these characters are not printed on surface 70, but are used herein to indicate positions on surface 70). There may be many such regions on the surface 70. Associated with each region on surface 70 is a unique pattern of marks. The regions on surface 70 may overlap because even if some marks are shared between overlapping regions, the pattern of marks in a region is still unique to that region.

FIG. 4 shows a region of dots on a surface 19 (on a sheet of paper, for example) that can be used to store encoded information according to one embodiment of the invention. In order to read this information, the pen-based computer 100 is placed down on any portion of the region. Although the example of FIG. 4 shows a sheet of paper, embodiments in accordance with the invention can be implemented on other types and shapes of surfaces made of various types of materials, as mentioned above.

The region includes a pattern of marks such as dots. In the embodiment, the pattern is decoded to obtain a unique location within a larger map area. The location may be of an (x, y) coordinate pair. The surface of this region can include yet other information. For example, the surface may contain text-based or image-based information printed thereon in conjunction with the dot pattern. As a specific example, the surface may be a page that may include one or more pictures as well as the patterns of markings referred to above that can be utilized in combination with one or more applications stored by cartridge 28.

The information encoded by the pattern of marks in the region can be used in a variety of different ways. For instance, the decoded location information may be used to identify an application associated with that location. As such, when an optical pen (e.g., 100 or 200) reads the information encoded in the region and identifies the application associated with that region, the optical pen can determine whether that identified application is resident to its memory 48 or the memory 30 a cartridge (e.g., 28), if one is coupled to it. If the identified application cannot be located, the optical pen (e.g., 100 or 200) can be programmed to notify its user of the cartridge that is to be utilized in combination with the region. For example in one embodiment, the optical pen (e.g., 100 or 200) can use audio output device 36 to output an audible message, such as: "To use this region, please snap on the 'Educational Games' cartridge." In this manner, the optical pen (e.g., 100 or 200) can provide its user an informative message for its proper utilization. Moreover, interaction with the region can invoke a command that causes the optical pen (e.g., device 100 or 200) to play or output or convey a recorded message that instructs the user to insert or snap on or couple a particular cartridge (e.g., 28) to the device that includes an application for proper operation with that identified area or region.

Figure 5:
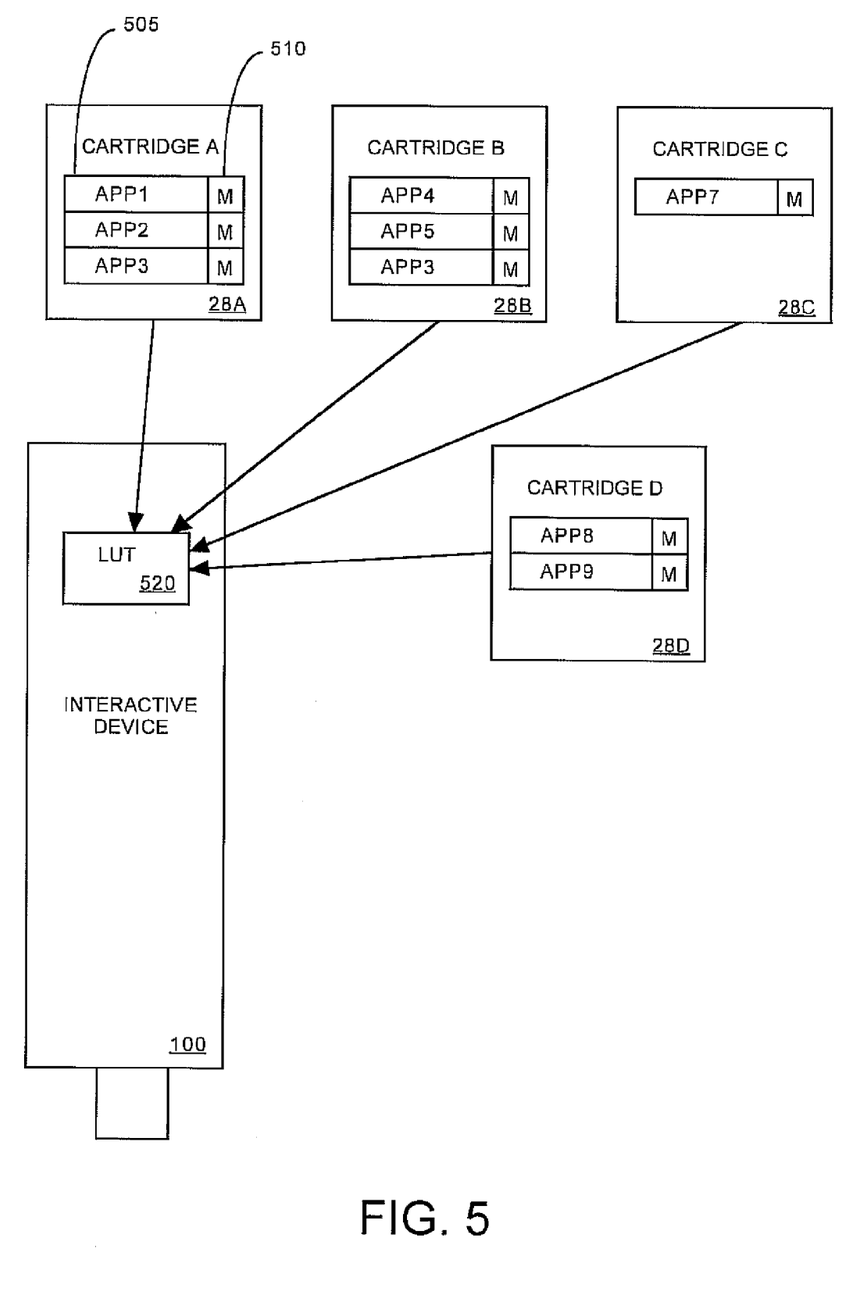
FIG. 5 is a diagram illustrating that various different cartridges with different applications resident thereon may be used in conjunction with a single interactive device in accordance with various embodiments of the present invention.

FIG. 5 is a diagram illustrating that various cartridges 28A-28D that may be used in conjunction with a single pen device 100 (or 200) in accordance with various embodiments of the invention. In accordance with various embodiments, the various cartridges 28A-28D may each contain (in memory) one or more different applications. For instance, cartridge 28A contains memory resident applications 1-3 and cartridge 28D contains memory resident applications 8-9. With each application, the various cartridges also contain (within memory) application information 510. This application information 510 may include an identification of the application and a certain message associated with that application. The message may be an audible recording or a text message, for instance. The information 510 can be any message associated with the application.

Also shown in FIG. 5 is a memory resident cartridge lookup table (LUT) 520 resident within the interactive pen device 100. This lookup table 520 is operable to store a cartridge registry that includes instructional messages for accessing associated applications. In particular, the messages include an identification of the cartridge in which a particular application resides.

Figure 6:
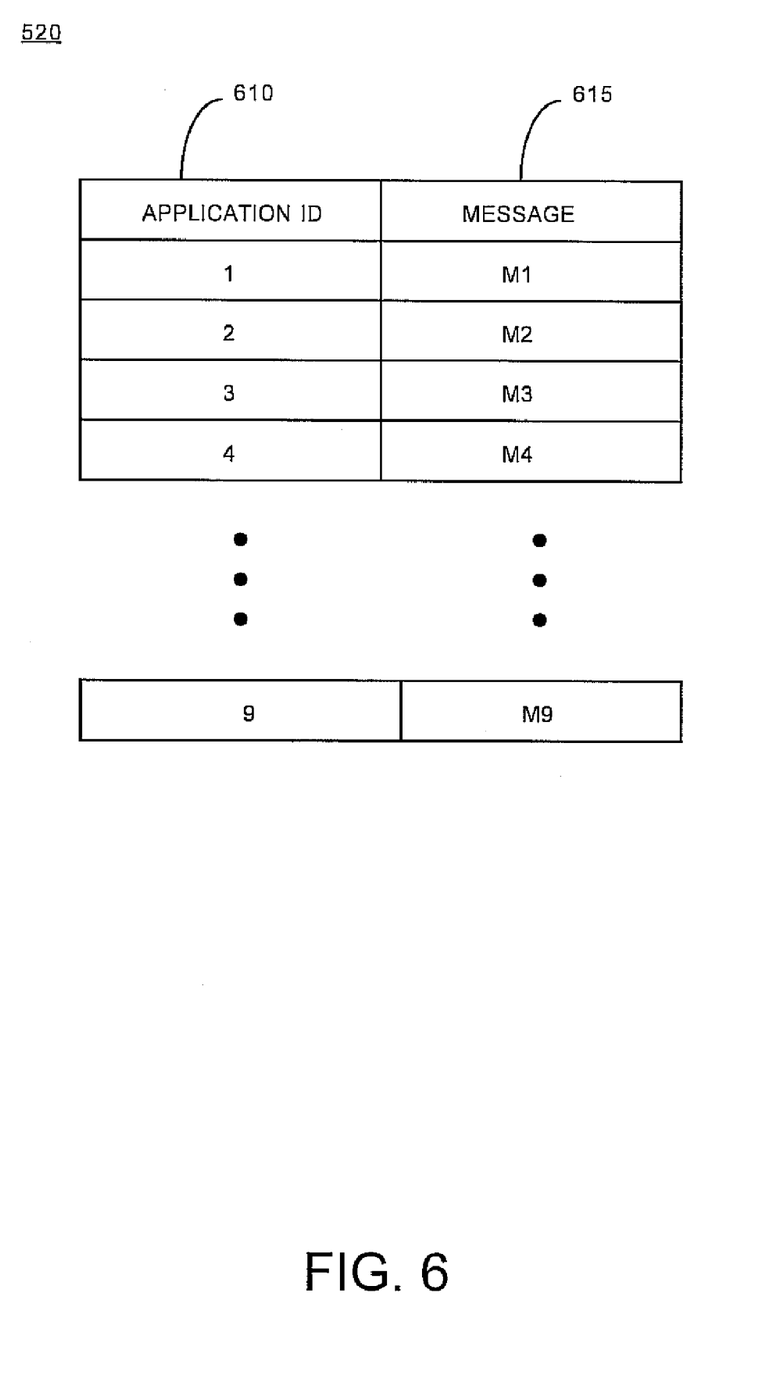
FIG. 6 illustrates a populated cartridge lookup table after the cartridges of FIG. 5 have been inserted (one per time) into the interactive device in accordance with various embodiments of the present invention.

As shown in FIG. 6, this memory resident lookup table 520 is designed to accommodate the application information 510 of the various cartridges shown in FIG. 5. This application information, in the aggregate, comprise a cartridge registry. FIG. 6 illustrates an exemplary cartridge lookup table 520 in accordance with one embodiment of the present invention. There may be one entry for each unique application. In column 610 is stored application identifiers (e.g., coded information unique to the application) and in column 615 is stored an application message. The application message may be a sound encoding or may be text, for instance. The message may be intended to be played when a user attempts to use an application that is not present within the cartridge that is currently inserted into (or coupled to) the pen device 100. Therefore, message M1 associated with application 1 may convey "You need to insert cartridge A before application 1 can be used." This may be in sound signal format or in text format, in one embodiment. It is noted that exemplary cartridge lookup table 520 of FIG. 6 includes nine entries and that each entry corresponds to an application that is shown in FIG. 5 along with its corresponding message.

Figure 7A:
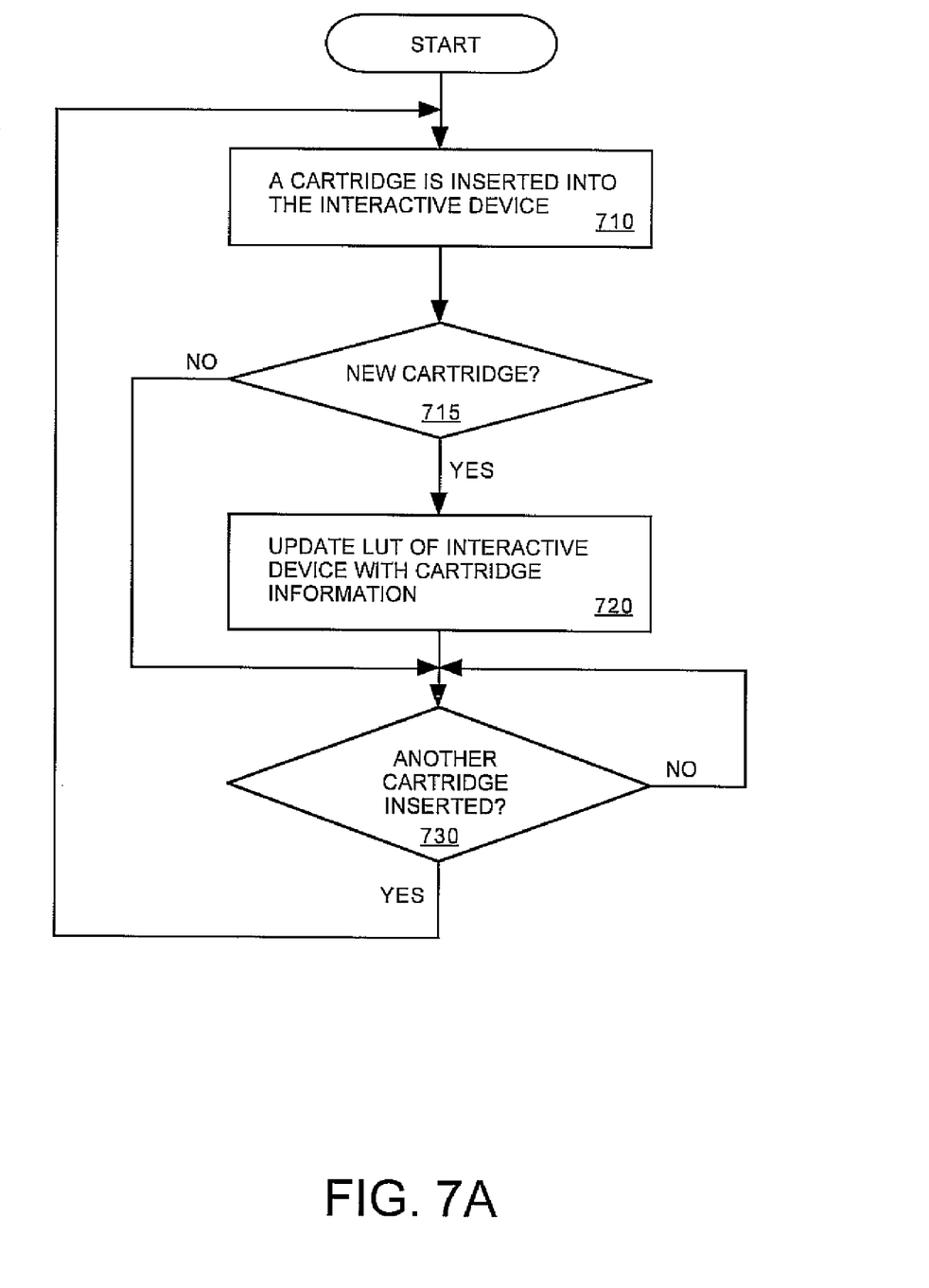
FIG. 7A illustrates a flow diagram of the cartridge lookup table of the interactive device being populated in accordance with various embodiments of the invention.

As shown in FIG. 7A is a computer implemented process 750 for populating the entries of the cartridge lookup table 520 in accordance with various embodiments of the invention. Method 750 includes exemplary processes of various embodiments of the invention which can be carried out by a processor(s) and electrical components under the control of computing device readable and executable instructions (or code), e.g., software. The computing device readable and executable instructions (or code) may reside, for example, in data storage features such as volatile memory, non-volatile memory and/or mass data storage that are usable by a computing device. However, the computing device readable and executable instructions (or code) may reside in any type of computing device readable medium. Although specific operations are disclosed in method 750, such operations are exemplary. That is, method 750 may not include all of the operations illustrated by FIG. 7A. Also, method 750 may include various other operations and/or variations of the operations shown by FIG. 7A. Likewise, the sequence of the operations of method 750 can be modified. It is noted that the operations of method 750 can be performed by software, by firmware, by electronic hardware, or by any combination thereof.

As previously mentioned, FIG. 7A is a computer implemented process 750 for populating the entries of the cartridge lookup table 520 in accordance with various embodiments of the invention. Generally, the first time each cartridge 28A-28D is used, its application information is loaded into the lookup table 520 resident on the pen device 100. For example, at 710 a cartridge is inserted by the user into the pen device and the pen device (e.g., 100) recognizes the cartridge automatically. At 715, the pen device determines if this cartridge has been inserted into the pen device before. If so, then 730 is entered. Otherwise, this is the first time the pen device has encountered this cartridge and 720 is entered. At 720, the pen device reads the memory (e.g., 30) of the cartridge and downloads its application information and updates its lookup table 520 with this information. At this point, the pen device is able to remember the applications that are resident on this cartridge and has a useful user message for each application resident on the cartridge. Operation 730 is then entered. If the user replaces the current cartridge with another cartridge, then 710 is entered again. Process 750 repeats. However, if it is determined at 730 that another cartridge has not been inserted, 730 can be repeated.

Figure 7B:
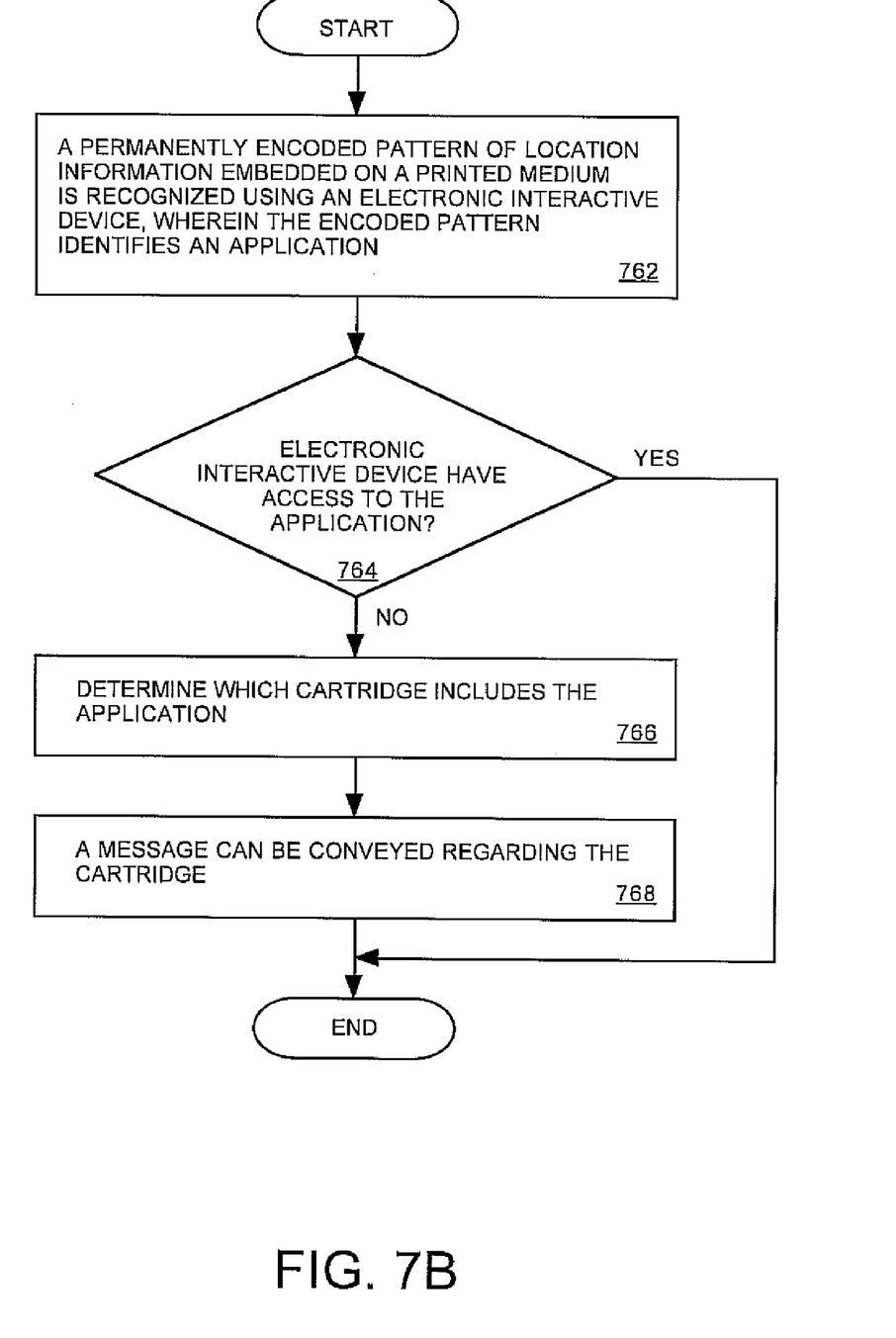
FIG. 7B is a flow diagram of a computer implemented method in accordance with various embodiments of the invention for utilizing a cartridge registry cartridge lookup table.

FIG. 7B is a flow diagram of a computer implemented method 760 for conveying cartridge notification in accordance with various embodiments of the invention. Method 760 includes exemplary processes of various embodiments of the invention which can be carried out by a processor(s) and electrical components under the control of computing device readable and executable instructions (or code), e.g., software. The computing device readable and executable instructions (or code) may reside, for example, in data storage features such as volatile memory, non-volatile memory and/or mass data storage that are usable by a computing device. However, the computing device readable and executable instructions (or code) may reside in any type of computing device readable medium. Although specific operations are disclosed in method 760, such operations are exemplary. That is, method 760 may not include all of the operations illustrated by FIG. 7B. Also, method 760 may include various other operations and/or variations of the operations shown by FIG. 7B. Likewise, the sequence of the operations of method 760 can be modified. It is noted that the operations of method 760 can be performed by software, by firmware, by electronic hardware, or by any combination thereof.

Specifically, a permanently encoded pattern of location information embedded on a printed medium can be recognized using an electronic interactive device. It is noted that the encoded pattern identifies an application. A determination can be made as to whether the electronic interactive device has access to the application, e.g., is this application currently resident in the attached cartridge. In response to the electronic interactive device not having access to the application, it can be determined which cartridge includes the application by using a cartridge lookup table (e.g., 520).

In response, a message can be conveyed by the pen device to the user regarding the proper cartridge that is required for use of the application.

At operation 762 of FIG. 7B, a permanently encoded pattern of location information embedded on a printed medium can be recognized using an electronic interactive device (e.g., 100 or 200), wherein the encoded pattern identifies one or more applications. It is understood that operation 762 can be implemented in a wide variety of ways. For example, each application can be implemented as any interactive activity associated with the electronic interactive device, such as, but not limited to, games, educational activities, using reference materials, using a diary, and the like. As described above, in various embodiments of the invention, device 100 or 200 is operable for recognizing a pattern of dots embedded on a printed medium (e.g., surface 70 of FIG. 1). In various embodiments of the invention, the pattern of dots may comprise a unique pattern of marks that identify a location associated with an area (or region) defined for a specific application or applications. In various embodiments of the invention, the pattern of dots may comprise a unique pattern of marks in a specified region as described above with reference to FIG. 4. In various embodiments of the invention, the printed medium may comprise, but is not limited to, paper (e.g., 15), a catalog, advertisement, a direct mailing, a circular, a book, a pad of paper, a flyer, a report, a magazine, a newspaper, an order form, or the like. It is noted that operation 762 can be implemented in any manner similar to that described herein, but is not limited to such.

At operation 764, a determination can be made as to whether the electronic interactive device (e.g., 100 or 200) has access to the application. It is understood that operation 764 can be implemented in a wide variety of ways. For example in one embodiment, the electronic interactive device can determine at operation 764 whether the application is stored on the memory (e.g., 30) of a currently inserted cartridge (e.g., 28). In another embodiment, the electronic interactive device can determine at operation 764 whether the application is stored on its memory 48. Understand that operation 764 can be implemented in any manner similar to that described herein, but is not limited to such.

At operation 766 of FIG. 7B, a determination can be made to determine (or identify) which cartridge (e.g., 28) includes the application. It is understood that operation 766 can be implemented in a wide variety of ways. For example in one embodiment, the electronic interactive device can determine at operation 766 which cartridge includes the application by accessing and/or referencing a database or cartridge lookup table 520 stored by its memory 48 that includes that information. In another embodiment, the electronic interactive device can determine at operation 766 which cartridge includes the application by utilizing its transceiver to wirelessly accessing a database or lookup table stored remotely that includes that information. It is appreciated that operation 766 can be implemented in any manner similar to that described herein, but is not limited to such.

At operation 768, a message can be conveyed (or output or rendered) regarding the cartridge (e.g., 28). It is understood that operation 768 can be implemented in a wide variety of ways. For example in one embodiment, the electronic interactive device can convey at operation 766 a message regarding the cartridge by utilizing its audio output device 36 and/or its display device 40. In one embodiment, the message regarding the cartridge can be an instructional or informative message that is obtained from the cartridge lookup table 520.

For example, the instructional or informative message can inform the user of the electronic interface device which cartridge is to be used with (or coupled to) the electronic interactive device in order to use the specific area or region of the printed medium that includes the encoded pattern of location information embedded thereon. The message may be obtained from the cartridge lookup table 520 entry that is specific to the application that the user is attempting to invoke. In one embodiment, the message may include the phase, "To use this area, the XYZ cartridge should be inserted into the device." Alternatively, the message may include the phase, "The XYZ cartridge is needed for the device to operate in this specific area."

In various embodiments, the message can be an audible message output by an audio output device (e.g., 36). If the message stored in the cartridge lookup table 520 is a sound recording, then it can be directly rendered to the user via a speaker output device. However, if the message is a text message, it can be rendered via the speaker by voice synthesis processes. In an embodiment, the message can be a text message output or conveyed by a display device (e.g., 40). It is appreciated that the message could be any informative message regarding the cartridge that includes the identified application. Note that operation 768 can be implemented in any manner similar to that described herein, but is not limited to such. Upon completion of operation 768, process 760 can be exited.

It is appreciated that an embodiment in accordance with the invention can be invoked when a user of device 100 (or 200) taps on (or passes it near) a region of dot space that belongs to an application that is stored on a cartridge (e.g., 28) that is not currently attached to device 100. For example, if that cartridge was previously attached or coupled to that particular device 100, the information that was downloaded at that time will have included a reference to all the dot space regions that are "owned by" or assigned to the applications stored on that cartridge. As such, device 100 will be invoked to inform the user via a message of the proper cartridge to be using to access that region of dot space.

The foregoing descriptions of various specific embodiments in accordance with the invention have been presented for purposes of illustration and description. They are not intended to be exhaustive or to limit the invention to the precise forms disclosed, and obviously many modifications and variations are possible in light of the above teaching. The invention can be construed according to the Claims and their equivalents.

What is claimed is:

1. A system comprising:
    a removable cartridge comprising an application and information relating to said application including an instructional message regarding access to said application; and
    an electronic interactive device operable to be attached to said cartridge and comprising:
        a communication device; and
        a lookup table comprising a plurality of entries wherein each entry comprises an instructional message corresponding to an associated application wherein each instructional message is operable to be rendered via said communication device in response to said electronic interactive device identifying an associated application that is not resident within said electronic interactive device or a cartridge attached thereto, wherein said electronic interactive device identifies said associated application based on an encoded pattern of dots on a writable surface.

2. The system of claim 1, wherein said communication device comprises an audio output device.

3. The system of claim 1, wherein said communication device comprises a display device.

4. The system of claim 1, wherein said instructional message comprises an audible message.

5. The system of claim 1, wherein said instructional message comprises a text message.

6. The system of claim 1, wherein said removable cartridge is operable to convey said information relating to said application to said cartridge lookup table of said electronic interactive device.

7. An electronic interactive device comprising:
   an optical unit for use with a printed medium comprising an encoded pattern of dots of location information, said optical unit for detecting said encoded pattern of dots;
   a writing tool for manually writing on said printed medium;
   a processor coupled with said optical unit; and
   a memory coupled with said processor, said memory for storing instructions that when executed implement a method comprising:
      recognizing said encoded pattern of dots identifies an application;
      determining whether said memory comprises said application; and
      in response to said memory not comprising said application, conveying an instructional message regarding access to said application.

8. The electronic interactive device of claim 7, wherein said method further comprising:
   in response to said memory not comprising said application, determining which cartridge comprises said application by accessing a cartridge lookup table resident within said electronic device wherein said cartridge lookup table comprises a plurality of entries, each entry comprising a respective instructional message for an associated application.

9. The electronic interactive device of claim 7, further comprising:
   a communication device coupled to said processor for said conveying said instructional message.

10. The electronic interactive device of claim 9, wherein said communication device comprises an audio output device.

11. The electronic interactive device of claim 9, wherein said communication device comprises a display device.

12. The electronic interactive device of claim 9, wherein said optical unit comprises an optical emitter and an optical detector.

* * * * *